(12) United States Patent
Mclaughlin et al.

(10) Patent No.: US 12,639,727 B2
(45) Date of Patent: *May 26, 2026

(54) SYSTEM AND METHOD FOR IDENTIFYING ONLINE ADVERTISEMENT LAUNDERING AND ONLINE ADVERTISEMENT INJECTION

(71) Applicant: DoubleVerify Inc., New York, NY (US)

(72) Inventors: Matthew Mclaughlin, Severna Park, MD (US); Roy Kalman Rosenfeld, Jerusalem (IL)

(73) Assignee: DoubleVerify Inc., New York, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/762,400

(22) Filed: Jul. 2, 2024

(65) Prior Publication Data

US 2025/0005616 A1    Jan. 2, 2025

Related U.S. Application Data

(63) Continuation of application No. 14/535,650, filed on Nov. 7, 2014, now Pat. No. 12,154,133.

(Continued)

(51) Int. Cl.
G06Q 30/0241        (2023.01)
G06F 16/951         (2019.01)
(Continued)

(52) U.S. Cl.
CPC ....... G06Q 30/0248 (2013.01); G06F 16/951 (2019.01); G06Q 30/0201 (2013.01);
(Continued)

(58) Field of Classification Search
CPC ........... G06Q 30/0248; G06Q 30/0201; G06Q 30/0251; G06Q 30/0277; G06F 16/951; H04L 63/1408; H04L 9/40
(Continued)

(56) References Cited

U.S. PATENT DOCUMENTS 4,649,264 A    3/1987    Carson
5,689,253 A    11/1997    Hargreaves et al.
(Continued)

FOREIGN PATENT DOCUMENTS

CN        101035128 A  *  9/2007

OTHER PUBLICATIONS

Brett Stone Gross, Understanding Fraudulent Activities in Online Ad Exchanges, 2011 (Year: 2011).*

(Continued)

*Primary Examiner* — Tarek Elchanti
(74) *Attorney, Agent, or Firm* — DLA PIPER LLP (US); Blake W. Jackson; Thomas J. Fuller

(57)        ABSTRACT

The present invention provides improved techniques for identifying online advertisement laundering and online advertisement injection that may occur during the serving of advertisements to browsers. For example, in one embodiment, a method of identifying fraudulent advertising activities may comprise obtaining information identifying a computer system of every party involved in supplying an advertisement to an end user device, determining whether a computer system of a first party and a computer system. of a second party provide websites and are not intermediary computer systems, determining whether the computer system of the first party provides a website of a type undesirable to advertisers, determining whether the computer system of the second party has usage and traffic characteristics indicative of not being an intermediary computer system, and determining a frequency of recurrence of the determined. conditions.

16 Claims, 5 Drawing Sheets

Related U.S. Application Data

(60) Provisional application No. 61/973,498, filed on Apr. 1, 2014.

(51) Int. Cl.

| | |
|---|---|
| *G06Q 30/0201* | (2023.01) |
| *G06Q 30/0251* | (2023.01) |
| *H04L 9/40* | (2022.01) |

(52) U.S. Cl.
CPC ..... *G06Q 30/0251* (2013.01); *G06Q 30/0277* (2013.01); *H04L 63/1408* (2013.01)

(58) Field of Classification Search
USPC .............................. 705/14.47, 14.71; 726/26
See application file for complete search history.

(56) References Cited

U.S. PATENT DOCUMENTS

| | | | |
|---|---|---|---|
| 7,418,382 | B1 | 8/2008 | Maes |
| 8,578,496 | B1 | 11/2013 | Krishnapp |
| 8,745,753 | B1 | 6/2014 | Gottlieb |
| 2001/0039622 | A1 | 11/2001 | Hitz |
| 2002/0010625 | A1 | 1/2002 | Smith |
| 2002/0062382 | A1 | 5/2002 | Rhoads |
| 2002/0087599 | A1 | 7/2002 | Grant et al. |
| 2002/0130976 | A1 | 9/2002 | Gutta et al. |
| 2002/0161467 | A1 | 10/2002 | Hashiguchi |
| 2002/0167540 | A1 | 11/2002 | Dobbelaar |
| 2003/0131106 | A1 | 7/2003 | Kasriel |
| 2003/0200258 | A1 | 10/2003 | Hayashi |
| 2004/0117316 | A1 | 6/2004 | Gillum |
| 2004/0162879 | A1 | 8/2004 | Arcuri |
| 2004/0205119 | A1 | 10/2004 | Streble |
| 2005/0065811 | A1 | 3/2005 | Chu |
| 2005/0081138 | A1 | 4/2005 | Voss |
| 2005/0120016 | A1 | 6/2005 | Midgley |
| 2005/0159999 | A1 | 7/2005 | Totten |
| 2005/0235360 | A1 | 10/2005 | Pearson |
| 2005/0273368 | A1 | 12/2005 | Hutten |
| 2006/0026114 | A1 | 2/2006 | Gregoire |
| 2006/0047792 | A1 | 3/2006 | Dharmarajan |
| 2006/0074911 | A1 | 4/2006 | Neagovici-Negoescu |
| 2006/0206715 | A1 | 9/2006 | Cowan |
| 2007/0192485 | A1 | 8/2007 | McMahan |
| 2008/0052377 | A1 | 2/2008 | Light |
| 2008/0066181 | A1* | 3/2008 | Haveson ............ H04N 21/8355 |
| | | | 726/26 |
| 2008/0114875 | A1 | 5/2008 | Anastas |
| 2009/0030794 | A1 | 1/2009 | Scheflan |
| 2009/0248807 | A1 | 10/2009 | Fron |
| 2009/0265198 | A1 | 10/2009 | Lester |
| 2009/0271509 | A1 | 10/2009 | Cao |
| 2009/0313202 | A1 | 12/2009 | Grabarnik |
| 2009/0319388 | A1 | 12/2009 | Yuan |
| 2010/0082604 | A1 | 4/2010 | Gutt |
| 2010/0094860 | A1 | 4/2010 | Lin |
| 2010/0235406 | A1 | 9/2010 | Williams |
| 2010/0250714 | A1 | 9/2010 | Wehmann |
| 2010/0281046 | A1 | 11/2010 | Lee |
| 2010/0287099 | A1 | 11/2010 | Liu |
| 2011/0029393 | A1 | 2/2011 | Apprendi |
| 2011/0055023 | A1 | 3/2011 | Mcneeley |
| 2011/0066521 | A1 | 3/2011 | Rowe |
| 2011/0072052 | A1 | 3/2011 | Skarin |
| 2011/0125587 | A1 | 5/2011 | Netzer |
| 2011/0137733 | A1 | 6/2011 | Baird |
| 2011/0179084 | A1 | 7/2011 | Waddington |
| 2011/0251951 | A1 | 10/2011 | Kolkowitz |
| 2011/0270881 | A1 | 11/2011 | Borton |
| 2012/0016633 | A1 | 1/2012 | Wittenstein |
| 2012/0022926 | A1 | 1/2012 | Ramanathan |
| 2012/0036011 | A1 | 2/2012 | Schechter |
| 2012/0323702 | A1* | 12/2012 | Puentes .................. G06Q 30/02 |
| | | | 705/14.71 |
| 2013/0060856 | A1 | 3/2013 | Fried |
| 2013/0237300 | A1 | 9/2013 | Johnson |
| 2013/0339158 | A1 | 12/2013 | Xie |
| 2014/0115459 | A1 | 4/2014 | Norwood |
| 2014/0229268 | A1 | 8/2014 | Clapp |
| 2014/0236514 | A1 | 8/2014 | Icove |
| 2015/0012811 | A1 | 1/2015 | Chan |
| 2015/0161219 | A1 | 6/2015 | Bendiabdallah |
| 2015/0262227 | A1 | 9/2015 | Messer |

OTHER PUBLICATIONS

Trademark Electronic Search System (TESS), COMSCORE, Feb. 28, 2017, United States Patent and Trademark Office.

Trademark Electronic Search System (TESS), Wikipedia, Feb. 28, 2017 United States Patent and Trademark Office.

Trademark Electronic Search System (TESS), Craigslist, Feb. 28, 2017 United States Patent and Trademark Office.

DURRON57., "How Do I Hide Javascript Code in a Webpage," 2011, 11 pages.

Sayad S., "Decision Tree Classification," Way Back Machine Capture, Mar. 12, 2013, 4 pages, Retrieved from the Internet: URL: http://www.saedsayad.com/decsion_tree.htm.

Trademark Electronic Search System (TESS), LINUX, Jan. 4, 2017, United States Patent and Trademark Office.

* cited by examiner

202
Obtain Advertisement Delivery Daisy Chain

204
Analyze Advertisement Delivery Daisy Chain

206
Are Both First and Second Parties in Advertisement Delivery Daisy Chain Websites?

208
First Party Website Unsavory?

210
Second Party Website has Irregular Characteristics?

212
Do 206, 208, and 210 Recur?

200

402
Obtain Advertisement Delivery Daisy Chain

404
First Party Known to not Carry Advertising

406
Identify all Intermediaries in Advertisement Delivery Daisy Chain

408
Determine Frequency of Intermediaries

400

SYSTEM AND METHOD FOR IDENTIFYING ONLINE ADVERTISEMENT LAUNDERING AND ONLINE ADVERTISEMENT INJECTION

PRIORITY CLAIMS/RELATED APPLICATIONS

This application is a continuation of and claims the benefit of priority under 35 USC 120 and 121 to U.S. patent application Ser. No. 14/535,650 filed Nov. 7, 2014, entitled "System and Method for Identifying Online Advertisement Laundering and Online Advertisement Injection" that in turn claims the benefit of and priority under 119(e) and 120 to U.S. Provisional Application Ser. No. 61/973,498, filed Apr. 1, 2014, and entitled "System and Method for Identifying Hidden Content", the entirety of which is incorporated herein by reference

FIELD OF THE INVENTION

The present invention relates to identifying online advertisement laundering and online advertisement injection that may occur during the serving of advertisements to browsers.

DESCRIPTION OF THE RELATED ART

Web pages contain many different content elements that may be displayed in the browser, such as advertisements. When an advertisement is delivered to the browser, there are usually one or more parties involved in the serving process. For example, frequently 3-4 parties or even 5-10 different parties may be involved in the serving of a single advertisement. This is typically referred to as the advertisement serving "daisy chain". The advertisement is handed off from one advertisement party to the next in the serving process. The first party in the chain is the website that provides the web page, and the second party in the chain is typically an ad server operated by the website. Many times, the last party in the chain is the ad server or a measurement technology operated by the advertiser that owns the ad that will actually be delivered to the browser. Typically, there are also multiple ad servers in between that belong to various advertising intermediary organizations. There are thousands of different intermediary organizations and millions of different websites that can potentially be involved in a transaction.

The multiple levels of intermediaries and websites in the ad serving process creates opaqueness and confusion which is many times exploited by fraudulent websites and fraudulent intermediaries to game the advertising system for financial profit. A need arises for a technique by which such online advertisement laundering and online advertisement injection can be identified so that these activities can be blocked and prevented.

SUMMARY OF THE INVENTION

The present invention provides improved techniques for identifying online advertisement laundering and online advertisement injection that may occur during the serving of advertisements to browsers.

For example, in one embodiment, a method of identifying online advertisement laundering may comprise obtaining information identifying a computer system of every party involved in supplying an advertisement to an end user device, determining whether a computer system of a first party and a computer system of a second party provide websites and are not intermediary computer systems, determining whether the computer system. of the first party provides a website of a type undesirable to advertisers, determining whether the computer system. of the second party has usage and traffic characteristics indicative of not being an intermediary computer system, and determining a frequency of recurrence of the determined conditions.

The information identifying a computer system of every party involved in supplying an advertisement to an end user device may be obtained using a crawler that renders a web page including the advertisement, by extracting the information from the browser through a plugin or clickstream data, by extracting through html code embedded in the information or the web page being displayed, receiving it through web server or ad server log files, or provided by another party. Whether a computer system of a first party and a computer system of a second party provide websites and are not intermediary computer systems may be determined using a list of intermediaries. Whether the computer system of the first party provides a website of a type undesirable to advertisers may be determined using a list of websites. Whether the computer system of the second party has usage and traffic characteristics indicative of a content site and not of an intermediary is determined based on, for example, a sudden increase in traffic or based on a high level of traffic but low activity in social media. A. relatively high frequency of recurrence of the determined conditions may indicate an increased likelihood that advertisement laundering is occurring.

For example, in one embodiment, a method of identifying online advertisement injection may comprise obtaining information identifying a computer system of every party involved in supplying an advertisement to an end user device, determining whether a website provided by a computer system of a first party is known not to carry advertising, identifying intermediary computer systems among the computer systems of every party involved in supplying an advertisement to an end user device, and determining a frequency of occurrence of each intermediary computer system.

The information identifying a computer system of every party involved in supplying an advertisement to an end user device may be obtained using a crawler that renders a web page including the advertisement, by extracting the information from the browser through a plugin. or clickstream data, by extracting through html. code embedded in the information or the web page being displayed, by using a crawler that renders the web page being displayed, or by using information provided by another party. Whether a website provided by a computer system of a first party is known not to carry advertising may be determined using a list of websites. When a frequency of occurrence of a particular intermediary computer system is above-average in frequency or when a frequency of occurrence of a particular intermediary computer system is less than a frequency of occurrence of other intermediary computer systems in scenarios that are known to not involve ad injection, there may be a greater likelihood that the intermediary is engaging in advertisement injection.

DETAILED DESCRIPTION OF THE INVENTION

Figure 1:
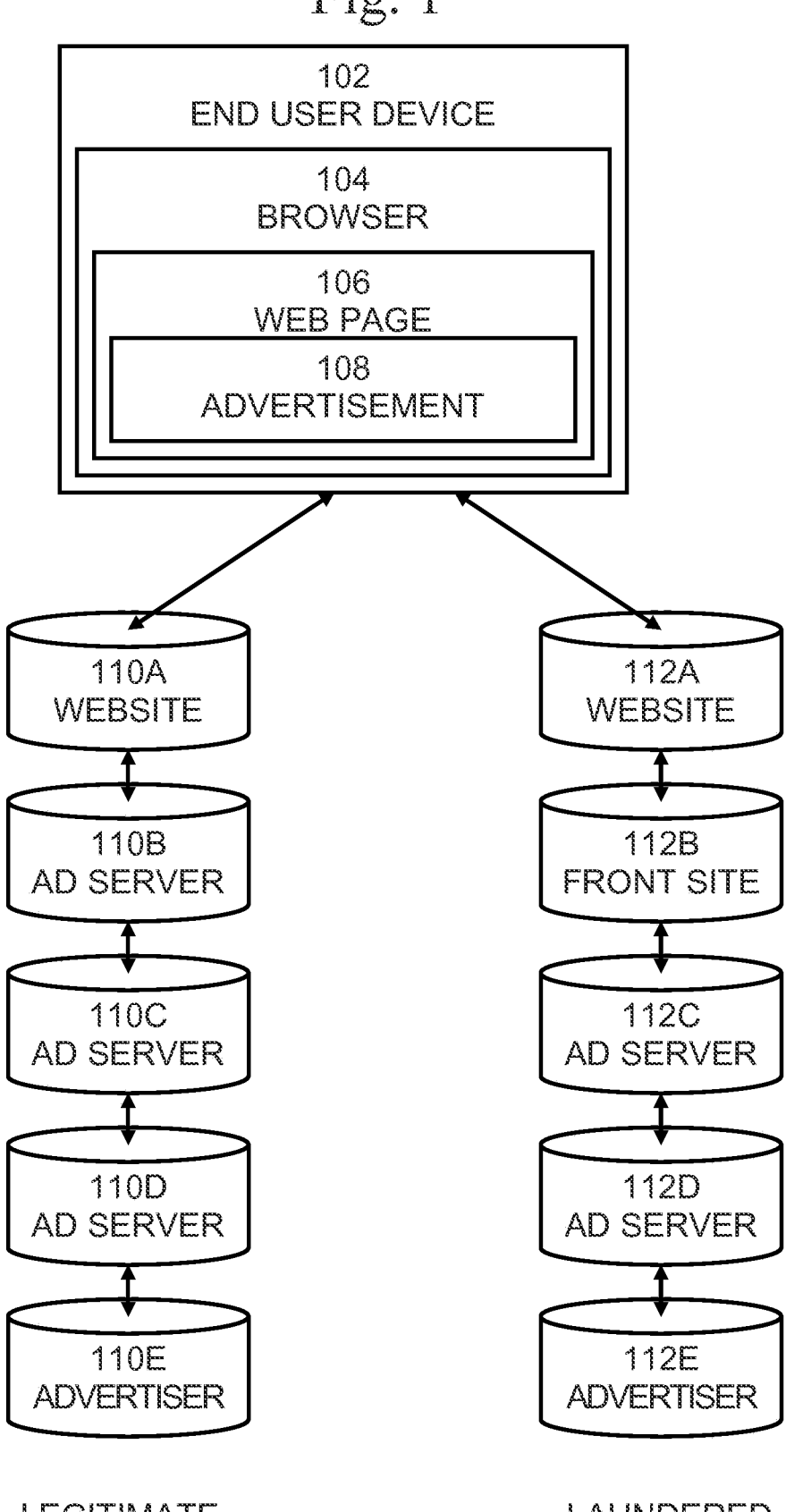
FIG. 1 is an exemplary block diagram of an embodiment of a system in which online advertising laundering may occur and in which online advertising laundering may be detected.

The present invention provides improved techniques for identifying online advertisement laundering and online advertisement injection that may occur during the serving of advertisements to browsers.

Ad laundering occurs when a website delivering advertisements is concealing its true identity when soliciting advertisements from advertisers and presents itself as a different website. This may occur directly, with the website directly misrepresenting itself, or this may occur through intermediaries. For example, the hypothetical website pirated-content.com knows they cannot get advertisements, so they partner with the hypothetical shady-intermediary-ad-server.com and call their tag. The shady advertisement server then calls a page on the hypothetical website seemingly-legitimate-front-site.com where advertisements are subsequently displayed as if the impression originated on that site. This is a case where the website is not laundering directly but instead is laundering by-proxy using other parties. This is usually done by websites with a good amount of real traffic but unsavory content that advertisers would reject in the advertising exchange environment. For example, websites with pirated content are generally not favored by advertisers.

In the advertising marketplace environment, advertising space is purchased at an auction by machines on behalf of the advertiser, based on rules prescribed by the advertiser or its agent. During the auction process, the unsavory website hands off the advertisement impression to one or more different websites. The advertisement impression is ultimately handed to a "front site" that passes itself off as a legitimate website, but the advertisement impression may be passed through one or more intermediaries first. The advertiser believes that the ad is going to be delivered on the front site and purchases it based on that belief. In practice, the front site is typically setup only for the purpose of deception. The ad serving setup is implemented in such a way that the rogue website makes a call to the front site or to an intermediary site, which in turn makes a call to the ad serving chain to start delivering the ad. Monitoring services such as standard ad verification services used by the advertiser may also be fooled into thinking the ad was delivered on the front site, while in practice it is delivered on the rogue website through the front site because of the special ad serving implementation.

Injected ads are ads "injected" into the page by a party other than the website or a party acting on its behalf. Sometimes, ads may be injected on top of or instead of the original ad delivered by the website, or sometimes ads may be injected in addition to ads delivered by the website or even injected on a website that doesn't contain any advertisements. Ad injection can be harmful to both the website and the advertiser as it can block the original ad from view or clutter up the page and reduce the value of the original advertiser ad. Examples of ways in which ad injection may be achieved include:

a. Software, such as toolbars/plugins, adware, and or malware-some of the toolbars or browser extensions/plugins installed by the user inject ads onto web pages as a monetization technique. Likewise, adware or malware may be installed in the browser or elsewhere on the user's computer system, with or without the user's knowledge, and may inject ads onto web pages as a monetization technique.

b. Internet service providers/proxies-some ISPs or proxies that users use to access the internet inject ads onto web pages as a monetization technique.

An exemplary system in which online advertisement laundering may occur may be detected is shown in FIG. 1. The system of FIG. 1 may include, but is not limited to, end user device 102, which includes browser program. 104, which is displaying web page 106, which includes advertisement 108, and advertisement serving chains 110A-E and 112A-E. The end user device 102 may include devices such as personal computers, workstations, tablet computers, smartphones, etc., that implement one or more browsing platforms. Browser 104 is an example of any of one or more browsing platforms, such as standard browser software, such as INTERNET EXPLORER®, CHROME®, FIREFOX®, SAFARI®, etc., or apps that are capable of limited or unlimited browsing. Web page 106 may be a web document that is suitable for the World Wide Web and the web browser, and which is being displayed by browser 104. Advertisement 108 may be an advertisement that is displayed within web page 106, and which may be obtained from advertisement daisy chain 110A-E or 112A-E.

Advertisement daisy chain 110A-E is an example of a typical "legitimate" daisy chain. Advertisement daisy chain 110A-E typically may include website 110A, which typically may include a web server for serving the content, such as web page 106, which is provided by website 110A. Advertisement server 110B typically may be an advertisement server operated by website 110A in order to fetch advertisements to be displayed in web pages served by website 110A. Advertiser 110E is the ultimate source of an advertisement, such as advertisement 108, and typically may include an advertisement server for serving the advertisements. Advertisement servers 110C and 110D typically may be an intermediate advertisement servers operated by various advertising intermediary organizations.

Advertisement daisy chain 112A-E is an example of a typical "laundered" daisy chain. Advertisement daisy chain 112A-E typically may include website 112A, which typically may include a web server for serving the content, such as web page 106, which is provided by website 112A. Front site 112B typically may be a server operated by website 112A in order to hide the true identity of website 112A. Advertiser 112E is the ultimate source of an advertisement, such as advertisement 108, and typically may include an advertisement server for serving the advertisements. Advertisement servers 112C and 112D typically may be an intermediate advertisement servers operated by various advertising intermediary organizations. Advertiser 112E believes that the advertisement is going to be delivered on the front site 112B and purchases the advertisement based on that belief. In practice the owner of the website 112A typically also owns the front site 112B, which is set up only for the purpose of deception. The advertisement serving setup is implemented in such a way that the website 112A makes a call to the front site 112B, which in turn makes a call to the advertisement serving chain 112C-112E to start delivering the ad.

Figure 2:
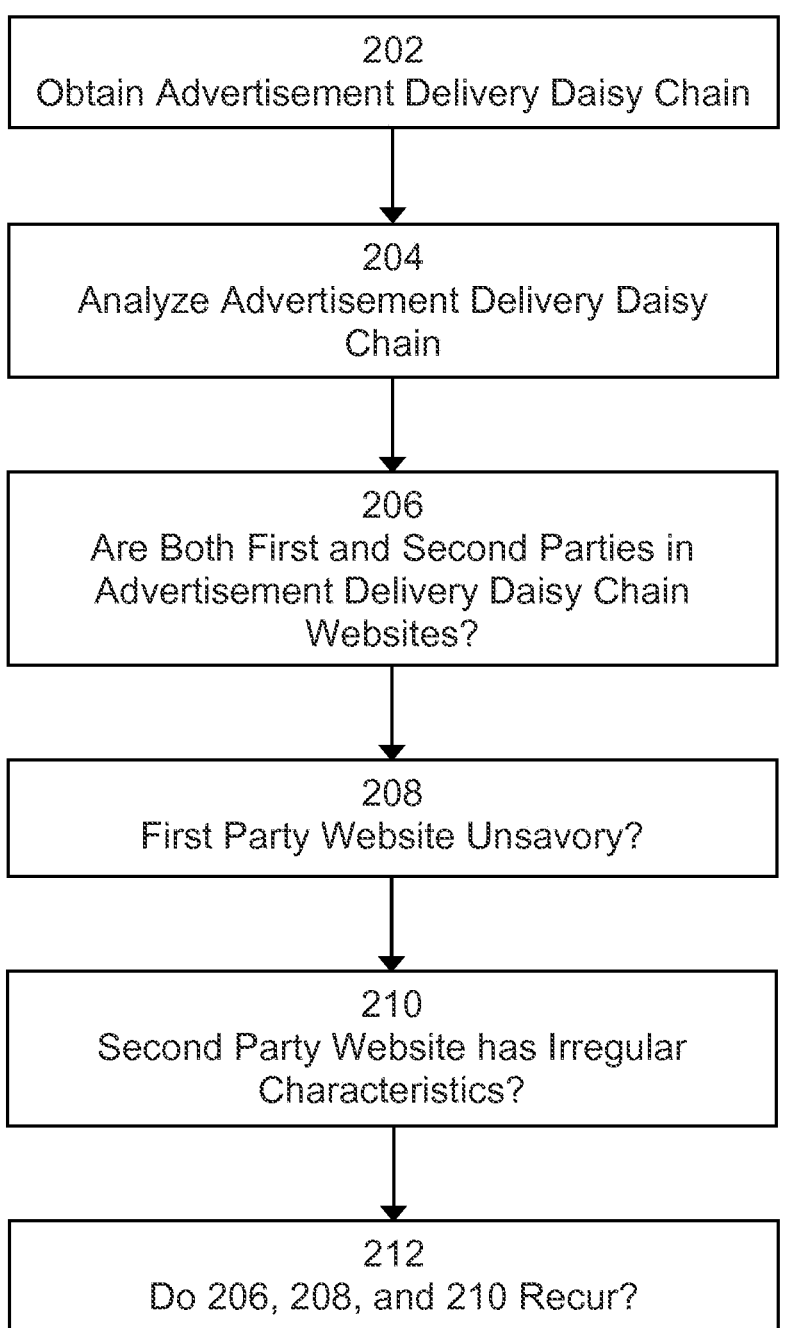
FIG. 2 is an exemplary flow diagram of an embodiment of a process for identifying laundered advertisements.

An example of a process 200 for identifying laundered advertisements is shown in FIG. 2. It is best viewed in conjunction with FIG. 1. Process 200 begins with step 202, in which the complete advertisement serving chain, such as advertisement serving chain 112A-112E, is obtained. The complete advertisement serving chain may be obtained in a number of ways. For example, a crawler that renders the page may be used. Likewise, the complete advertisement serving chain may be extracted from the browser through a plugin or clickstream data. Further, the complete advertisement serving chain may be extracted through html code embedded in the advertisement serving chain or the web page being displayed.

In step 204, the advertisement serving chain is analyzed. A number of analyses are performed, then the results of these analyses are compared to determine the likelihood that advertisement laundering is occurring. In step 206, it is determined whether more than one party in the advertisement serving chain are websites. For example, as shown in FIG. 2, both the first and second parties in the ad serving chain are websites, such as is the case with website 112A and front site 112B. This is a distinction from a legitimate advertisement serving chain, in which only one party is a website. In this example, typically, the first party is a website 110A and the second party is an ad server 110B. The determination that more than one party in the advertisement serving chain are websites creates a high level of suspicion that advertisement laundering is occurring. Further, if both or more parties are not intermediaries, they can all be assumed to be websites. This may be determined using one or more directories with lists of sites and intermediaries.

In step 208, it is determined whether the first party is a website that is of a type that is unsavory to advertisers (such as a site with adult content or copyright infringement content). If the first party is such a website, that makes it more likely to be a case of advertisement laundering, as this provides a "motive" for such laundering. This may be determined using one or more directories with lists of websites.

In step 210, it is determined whether the second party website shows other irregular characteristics, which are associated with the second party website not being an intermediary computer system. If so, this increases the likelihood that advertisement laundering is occurring. Examples of irregular characteristics may include, but are not limited to, a sudden increase in traffic as reported by third party measurement services such as ALEXA™ or COMSCORE™ and a high level of traffic but low activity in social media. These irregular characteristics are not associated with legitimate user activity and imply that the system is not an intermediary computer system. This suggests that the site is a front site setup only as a decoy to conceal the identity of the original site.

In step 212, it is determined whether the determinations of steps 206, 208, and 210 recur. When advertisement laundering, typically multiple recurring observations of the characteristics determined in steps 206, 208, and 210 occur at a relatively high frequency within the overall number of advertisements that are measured that are delivered to the first party. For example, if the majority of the times that an advertisement is delivered to the first party, the advertisement includes the same or similar website as the second party, this indicates an increased likelihood that advertisement laundering is occurring. Observation of this recurring pattern increases the likelihood that advertisement laundering is occurring.

Figure 3:
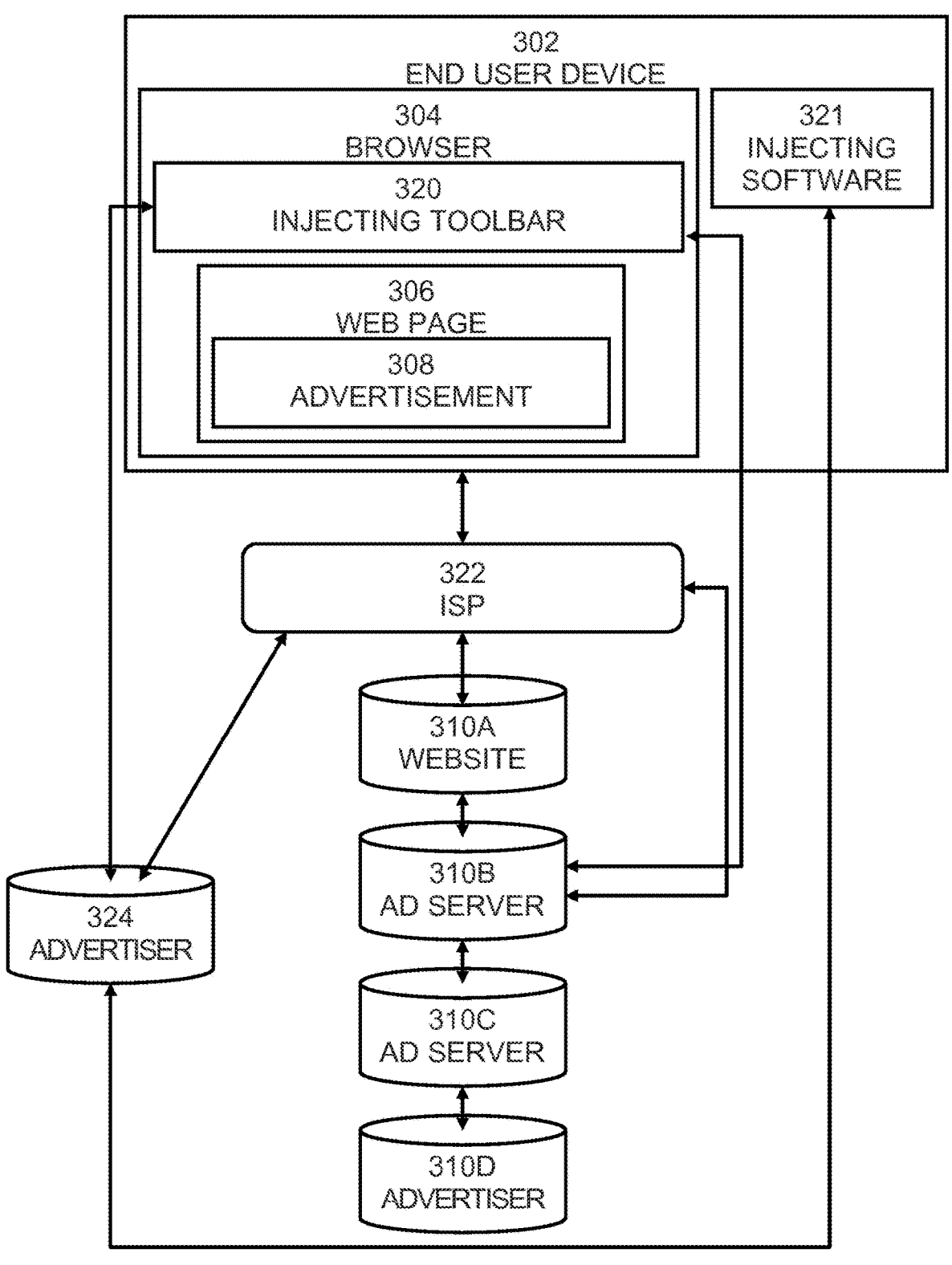
FIG. 3 is an exemplary block diagram of an embodiment of a system in which online advertising injection may occur and in which online advertising injection may be detected.

An exemplary system in which online advertisement injection may occur and may be detected is shown in FIG. 3. The system. of FIG. 3 may include, but is not limited to, end user device 302, which includes browser program 304, which is displaying web page 306, which includes advertisement 308, and advertisement daisy chains 310A-E and 312A-E. The end user device 302 may include devices such as personal computers, workstations, tablet computers, smartphones, etc., that implement one or more browsing platforms. Browser 304 is an example of any of one or more browsing platforms, such as standard browser software, such as INTERNET EXPLORER®, CHROME®, FIREFOX®, SAFARI®, etc., or apps that are capable of limited or unlimited browsing. Web page 306 may be a web document that is suitable for the World Wide Web and the web browser, and which is being displayed by browser 304. Advertisement 308 may be an advertisement that is displayed within web page 306, and which may be obtained from advertisement daisy chain 310A-D, which is typically a "legitimate" daisy chain.

Also shown in FIG. 3 are injecting toolbar 320, injecting software 321, and 1SP 322. Injecting toolbar 320 may be an actual toolbar, or it may be a browser extension or plugin that inject advertisements onto web pages as a monetization technique. Likewise, injecting software 321 may be adware or malware installed in the browser or elsewhere on the user's computer system, with or without the user's knowledge, and may inject ads onto web pages as a monetization technique. Injecting toolbar 320 and/or injecting software 321 may obtain advertisements to be injected directly from advertiser servers, such as advertiser 324, or injecting toolbar 320 and/or injecting software 321 may obtain advertisements to be injected from an advertisement server in a legitimate, or other, advertisement serving chain, such as advertisement server 310B. Likewise, ISP 322, which may be an Internet Service Provider, or a proxy, that users use to access the Internet may inject advertisements onto web pages as a monetization technique. ISP 322 may obtain advertisements to be injected directly from advertiser servers, such as advertiser 324, or ISP 322 may obtain advertisements to be injected from an advertisement server in a legitimate, or other, advertisement daisy chain, such as advertisement server 310B.

Figure 4:
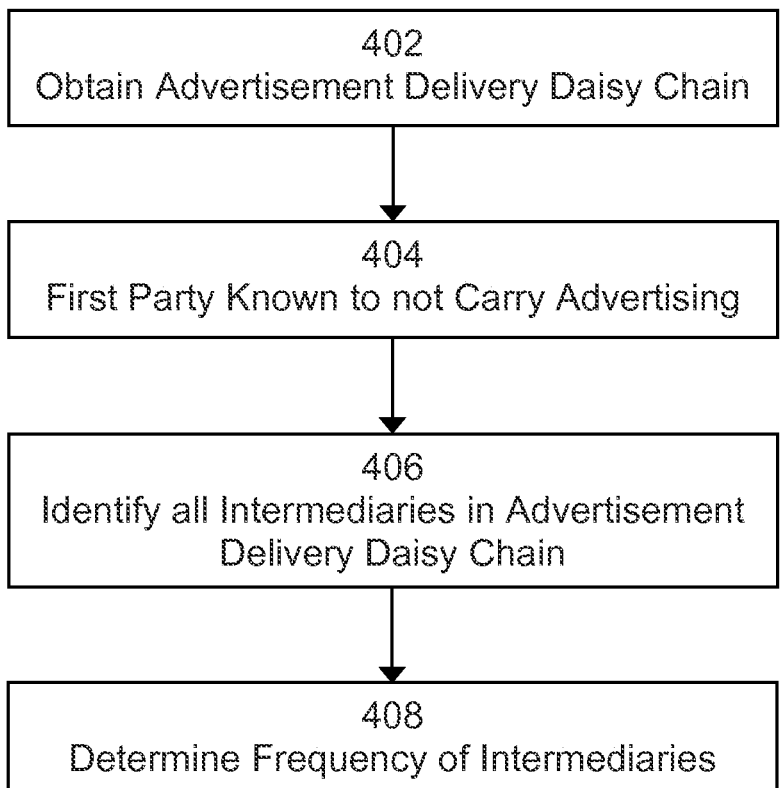
FIG. 4 is an exemplary flow diagram of an embodiment of a process for identifying injected advertisements.

An example of a process 400 for identifying injected advertisements is shown in FIG. 4. It is best viewed in conjunction with FIG. 3. Process 400 begins with step 402, in which the complete advertisement serving chain, such as advertisement serving chain 310A-D, is obtained. The complete advertisement serving chain may be obtained in a number of ways. For example, a crawler that renders the page may be used. Likewise, the complete advertisement serving chain may be extracted from the browser through a plugin or clickstream data. Further, the complete advertisement serving chain may be extracted through html code embedded in the advertisement serving chain or the web page being displayed, or by using information provided by another party.

In step 404, the first party in the advertisement serving chain, the website 310A is identified and it is determined whether this is a website that does not carry any advertising. This may be determined using one or more directories with lists of sites that don't carry advertisements. If the first party in the advertisement serving chain is a site known to not carry any advertisements (such as WIKIPEDIA™, CRAIGSLIST™, etc.), then there is a high likelihood that this is an advertisement injection is occurring. There are various existing directories listing sites that don't carry advertisements. In step 406, all the intermediaries in the advertisement serving chain are identified and the occurrence of each individual intermediary is recorded. In step 408, the frequency of occurrence of each intermediary is determined. If a particular intermediary shows up with above-average frequency, there is a greater likelihood that the intermediary is engaging in advertisement injection. Furthermore, if this intermediary shows up less frequently than others in scenarios that are known to not involve ad injection, there is a greater likelihood that the intermediary is engaging in advertisement injection. Once the intermediary has been identified in this way, the intermediary may then be identified as an injector across any site where advertisements are injected by detecting the domain used by the injector, then using that domain to detect advertisement injection in real-time across all users.

Figure 5:
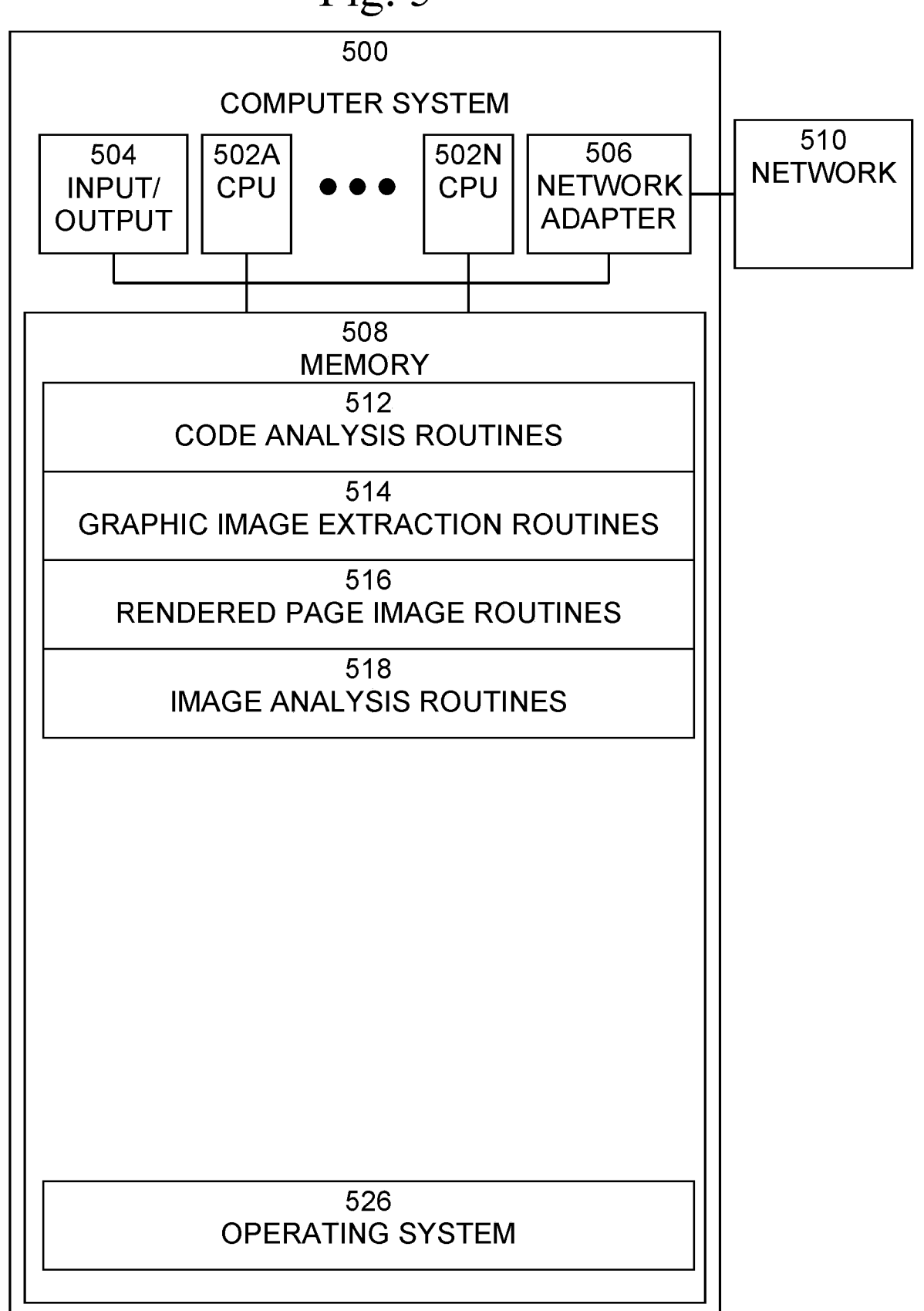
FIG. 5 is an exemplary block diagram of an embodiment of a system for detecting fraudulent advertising activities.

An exemplary block diagram of a computer system 500, in which the processes shown above may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform. the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 varies depending upon the function that computer system 500 is programmed to perform. In the example shown in FIG. 5, memory contents that may be included in a system in which online advertisement injection and/or online advertisement laundering detection is implemented are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 may include advertisement serving chain routines 512, advertisement laundering detection routines 514, advertisement injection detection routines 516, and operating system 518. Advertisement serving chain routines 512 may include routines for obtaining and analyzing advertisement serving chains, including complete advertisement serving chains. Advertisement laundering detection routines 514 may detect advertisement laundering. Advertisement injection detection routines 516 may detect advertisement injection. Operating system 526 provides overall system functionality.

As shown in FIG. 5, the present invention contemplates implementation on a system or systems that provide multi-processor, multi-tasking, multi-process, and/or multi-thread, computing, as well as implementation on systems that provide only single processor, single thread computing. Multi-processor computing involves performing computing using more than one processor. Multi-tasking computing involves performing computing using more than one operating system task. A. task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention may be implemented in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:

obtaining, at a computer system, an online advertisement serving chain (ASC) identifying a number of computer systems involved in supplying a webpage and an online advertisement to an end user device by implementing a web crawler to render the webpage with the online advertisement;

identifying all websites and computer systems serving websites that are part of a directory of the ASC;

a) determining, at the computer system, whether at least two separate computer systems in the ASC are providing HTML code serving separate websites from the directory for the ASC;

b) identifying, at the computer system, whether a first website provided by a first computer system in the ASC is part of a list of undesirable websites;

processing the first website to determine whether the first website is serving any advertisements;

identifying each intermediary in the ASC and a frequency of occurrence of advertisements originating from each intermediary;

retrieving a set of traffic data for a second website and third-party measurement data for the second website;

c) analyzing the ASC, at the computer system, the set of traffic data and the third-party measurement data for the second website provided by a second computer system in the ASC to determine whether a threshold level of traffic in the set of traffic data and less than a threshold level of third-party measurement data exists for the second website or whether an irregular level of traffic is present in the set of traffic data, indicative of an increased likelihood of fraudulent advertising activity;

performing steps a), b), and c) over a number of iterations, wherein an increased frequency of recurrence of the determinations a), b), and c) indicates an increased likelihood that advertisement laundering is occurring;

storing results for each of the number of iterations;

determining, at the computer system, whether a number of positive determinations made at steps a), b), and c) exceeds a threshold amount of determinations; and causing a blocking, at the computer system, of any advertisements from being displayed at a user device by any identified intermediary of the ASC based on determining that the number of positive determinations exceeds the threshold amount of determinations.

2. The method of claim 1, wherein whether a computer system of a first party or a computer system of a second party provide websites and are not intermediary computer systems is determined using a list of intermediaries.

3. The method of claim 1, wherein a computer system of a second party has usage and traffic characteristics indicative of a content site and not of an intermediary.

4. The method of claim 1, wherein the determination of a likelihood that there is fraudulent advertising activity, is a determination of a likelihood that a first party is concealing its identity.

5. The method of claim 1, wherein the online fraudulent advertising activity is at least one chosen from: online advertisement laundering and online advertisement injection.

6. The method of claim 1, wherein the online fraudulent advertising activity is online advertisement injection in which it is determined that a first number of advertisements are inserted in place of or in addition to a second number of advertisements.

7. A system comprising a processor, memory accessible by the processor, and program instructions and data stored in the memory, wherein the program instructions are executable by the processor to:

obtain an online advertisement serving chain (ASC) identifying a number of computer systems involved in supplying a webpage and an online advertisement to an end user device by implementing a web crawler to render the webpage with the online advertisement, using a plugin on a web browser, or by extracting HTML code embedded in the ASC or the webpage;

a) determine whether at least two separate computer systems in the ASC are providing HTML code serving separate websites from a directory for the ASC;

b) identify whether a first website provided by a first computer system in the ASC is part of a list of undesirable websites;

determine whether the first website is serving any advertisements;

identify each intermediary in the ASC and a frequency of occurrence of advertisements originating from each intermediary;

retrieve a set of traffic data for a second website and third-party measurement data for the second website;

c) analyze the set of traffic data and the third-party measurement data for the second website provided by a second computer system in the ASC to determine whether a threshold level of traffic in the set of traffic data and less than a threshold level of third-party measurement data exists for the second website or whether an irregular level of traffic is present in the set of traffic data, indicative of an increased likelihood of fraudulent advertising activity;

perform steps a), b), and c) over a number of iterations, wherein an increased frequency of recurrence of the determinations a), b), and c) indicates an increased likelihood that advertisement laundering is occurring;

store results for each of the number of iterations;

determine whether a number of positive determinations made at steps a), b), and c) exceeds a threshold amount of determinations; and cause a blocking, at the computer system, of any advertisements from being displayed at a user device by any identified intermediary of the ASC based on determining that the number of positive determinations made at steps a), b), and c) exceeds the threshold amount of determinations.

8. The system of claim 7, wherein the program instructions are executable by the processor to determine whether a computer system of a first party and a computer system of a second party provide websites and are not intermediary computer systems using a list of intermediaries.

9. The system of claim 7, wherein the program instructions are executable by the processor to determine if the computer system of the second party has usage and traffic characteristics indicative of a content site and not of an intermediary.

10. The system of claim 7, wherein the program instructions are executable by the processor to obtain the ASC by:

using a crawler that renders a web page including the online advertisement;

extracting the ASC from a browser through a plugin or clickstream data;

extracting the ASC through html code embedded in the online advertisement or a web page being displayed; or receiving the ASC through web server or ad server log files.

11. The system of claim 7, wherein the program instructions are executable by the processor to determine a likelihood that there is fraudulent advertising activity in the form of a first party concealing its identity.

12. A computer program product comprising a non-transitory computer readable medium storing program instructions that when executed by a processor perform a method comprising:

obtaining an online advertisement serving chain (ASC) identifying a number of computer systems involved in supplying a webpage and an online advertisement to an end user device by implementing a web crawler to render the webpage with the online advertisement, using a plugin on a web browser, or by extracting HTML code embedded in the ASC or the webpage;

a) determining whether at least two separate computer systems in the ASC are providing HTML code serving separate websites from a directory of websites and intermediaries that are part of the ASC;

b) identifying whether a first website provided by a first computer system in the ASC is part of a list of undesirable websites;

determining whether the first website is serving any advertisements;

identifying each intermediary in the ASC and a frequency of occurrence of advertisements originating from each intermediary;

retrieving a set of traffic data for a second website and third-party measurement data for the second website;

c) analyzing the set of traffic data and the third-party measurement data for the second website provided by a second computer system in the ASC to determine whether a threshold level of traffic in the set of traffic data and less than a threshold level of third-party measurement data exists for the second website or whether an irregular level of traffic is present in the set of traffic data, indicative of an increased likelihood of fraudulent advertising activity;

determining a frequency of recurrence of the results during each of a number of iterations, wherein an increased frequency of recurrence of the determinations a), b), and c) indicates an increased likelihood that advertisement laundering is occurring; and causing a blocking of any advertisements from being displayed at a user device by any identified intermediary of the ASC based on determining that the number of positive determinations made at steps a), b), and c) for the number of iterations exceeds a threshold amount of determinations.

13. The computer program product of claim 12, wherein the program instructions, when executed by the processor, determine whether a computer system of a first party and a computer system of a second party provide websites and are not intermediary computer systems using a list of intermediaries.

14. The computer program product of claim 12, wherein the program instructions, when executed by the processor, determine if the computer system of the second party has usage and traffic characteristics indicative of a content site and not of an intermediary.

15. The computer program product of claim 12, wherein the program instructions, when executed by the processor, obtain the ASC by:

using a crawler that renders a web page including the online advertisement;

extracting the ASC from a browser through a plugin or clickstream data;

extracting the ASC through html code embedded in the online advertisement or a web page being displayed; or receiving the ASC through web server or ad server log files.

16. The computer program product of claim 12, wherein the program instructions, when executed by the processor, determine a likelihood that there is fraudulent advertising activity in the form of a first party concealing its identity.

* * * * *